UNITED STATES PATENT OFFICE.

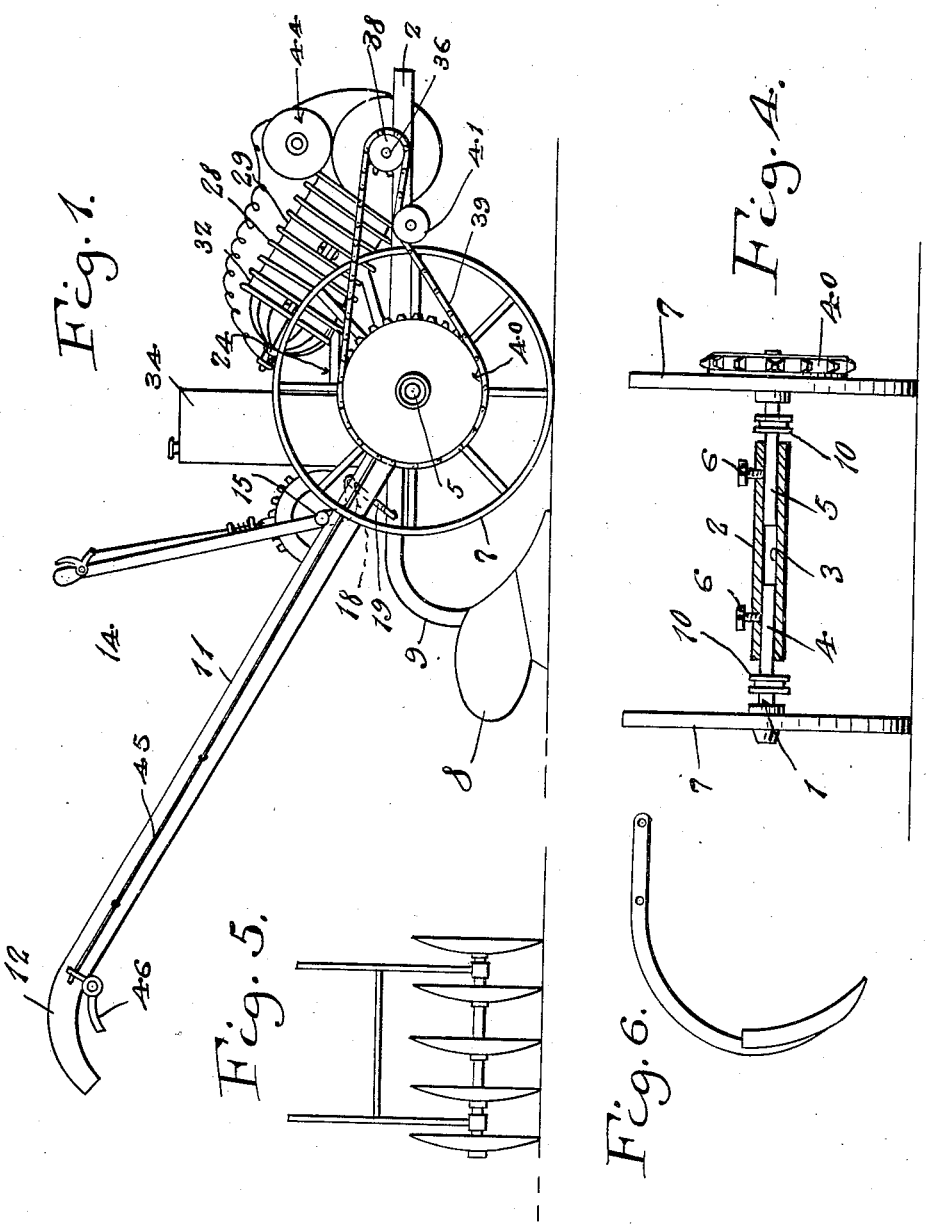

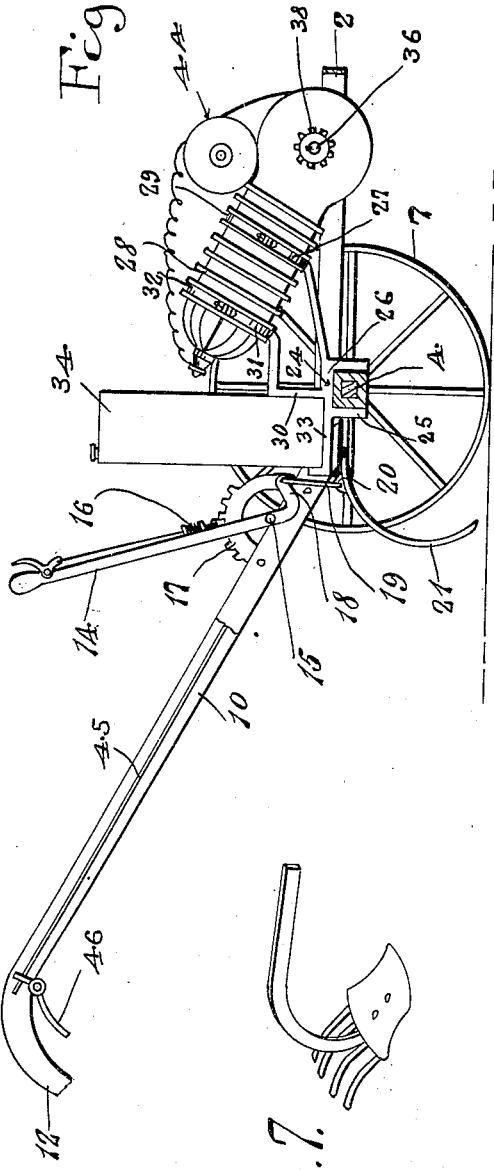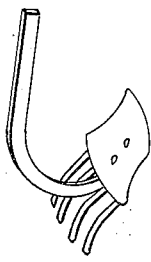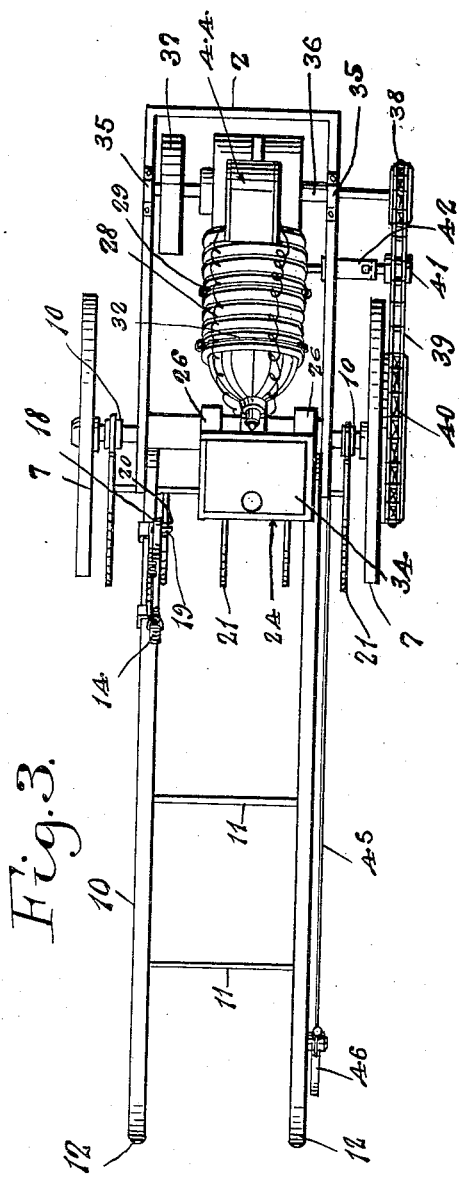

JOHN A. DECKER, OF CHICAGO, ILLINOIS.

MOTOR-DRIVEN AGRICULTURAL TOOL.

1,316,359.　　　　　　Specification of Letters Patent.　　Patented Sept. 16, 1919.

Application filed May 12, 1917. Serial No. 168,146.

*To all whom it may concern:*

Be it known that I, JOHN ANTON DECKER, a citizen of the United States, residing at Chicago, in the county of Cook and State of Illinois, have invented certain new and useful Improvements in Motor-Driven Agricultural Tools; and I do hereby declare the following to be a full, clear, and exact description of the invention, such as will enable others skilled in the art to which it appertains to make and use the same.

This invention relates to agricultural tools or implements, and the primary object of the invention is to connect a motor, of low horse power to the usual type of hand operated garden tools whereby the operator will be relieved of the manual labor contingent with the propelling of the tool, enabling him to devote his attention to the guiding of the machine and also enable him to cover considerable more ground with less fatigue than would be possible with a machine which was manually propelled.

A further object of this invention is to provide means for controlling the operation of the engine which means extends along the handle of the tool and has a hand grip positioned alongside one of the hand grips of the handles of the tool, so that operation of the engine may be easily controlled.

A still further object of this invention is to provide a hand lever for regulating the inserting depth of the various tools carried by the portable supporting structure of the tool or implement.

With the foregoing and other objects in view, this invention consists in such novel features of construction, combination and arrangement of parts as will be hereinafter more fully described, illustrated in the accompanying drawings, and claimed.

In describing the invention in detail, reference will be had to the accompanying drawings wherein like characters designate like and corresponding parts throughout the several views, and in which:—

Figure 1 is a side elevation of the improved tool or implement;

Fig. 2 is a longitudinal section through the tool or implement;

Fig. 3 is a top plan view of the tool or implement;

Fig. 4 is a fragmentary horizontal section illustrating the manner of adjusting the width of the portable frame of the implement;

Fig. 5 is a plan view of a tool used in connection with the portable frame;

Fig. 6 is a side elevation of a cultivator shovel which may be used in connection with the portable frame; and Fig. 7 is a detail view of a potato digging tool to be employed in connection with the portable frame.

Referring more particularly to the drawings, 1 designates the portable supporting structure of the tool or implement as an entirety which structure comprises a frame 2 which is positioned in a horizontal plane and has its rear end provided with a bore 3 in which the axles 4 and 5 are slidably mounted. The axles 4 and 5 may be held in adjusted position within the bore 3 by set screws or analogous devices 6. The axles 4 and 5 have the usual type of supporting wheels 7 mounted thereon and the adjustment of the axles 4 and 5 within the bore 3 is provided for regulating the distance between the supporting wheels, for accommodations of various types of agricultural implements or tools to be employed in connection with the portable frame.

In Fig. 1 of the drawings, a turning or breaking plow 8 is illustrated as connected to the supporting structure, and the beam 9 of the turning plow is connected to the axles 4 and 5 in any suitable manner.

The rear side of the frame 2 has handles 10 connected thereto, which handles are of the ordinary construction and braced by suitable braces 11. The handles 10 also have the usual form of hand grips 12 formed upon their free ends.

One of the handles 10 has a hand lever 14 pivotally connected thereto as shown at 15. A dog mechanism 16 is carried by the hand lever 14 and coacts with a quadrant 17 for holding the hand lever in various adjusted positions. The lower end of the hand lever 14, is bent upwardly as shown at 18 and it has a link 19 connected thereto, which link is detachably connected as shown at 20 to the tool 21 which is carried by the portable supporting structure of the tool or implement. In Figs. 2 and 3 of the drawings, a tool comprising a plurality of cultivating teeth are attached to the axles 4 and 5.

In Fig. 5 of the drawings, the usual type of disk harrow employed in connection with hand operated farming or gardening implement is illustrated, and in Fig. 6 a furrow opening shovel or single cultivating shovel is illustrated which is also of the usual construction employed in connection with hand or manually operated implements of this nature. The potato digging tool which is illustrated in Fig. 7 of the drawings, is also of the usual form employed in connection with agricultural tools or implements of this nature.

The rear side of the frame 2 has a bracket structure 24 carried thereby which bracket structure comprises a pair of right angularly disposed sections 25 and 26 which engage the rear and upper edges of the rear side of the frame 2 respectively, as clearly shown in Fig. 2 of the drawings. The horizontally positioned side 26 of the bracket 24 has a substantially semi-circular bracket 27 carried thereby which supports the cylinder 28 of the motor or engine structure. A substantially semi-circular strap 29 is attached to the substantially semi-circular bracket 27 and it extends over the top of the cylinder, as clearly shown in Fig. 2 of the drawings.

A second upstanding bracket arm 30 is formed upon the side 26 and it has its upper end angled and shaped to form a semi-circular portion 31 which coacts with a semi-circular strap 32 for supporting the upper rear end of the motor cylinder.

A rearwardly extending horizontally positioned plate 33 is formed upon the bracket 24 at the conjunction of the sides 25 and 26 and it coacts with the vertical portion of the bracket 30 for supporting a fuel retaining tank 34.

Suitable bearings 35 are carried by the frame 2 adjacent its forward end and they support the power or crank shaft 36 of the engine, upon which is mounted the usual type of fly wheel 37 and a power transmitting sprocket 38. A sprocket chain 39 travels about the sprocket 38 and about a sprocket 40 which is mounted upon the wheel 7, for propelling the wheel by the operation of the motor. A suitable idler sprocket 41 is carried by a bracket 42 which projects outwardly from the frame 2 and it engages the under surface of the lower run of the sprocket chain 39 for holding the chain taut.

The usual type of battery indicated at 44 is provided for providing the necessary spark for operating the engine.

The motor is controlled by a rod 45 which extends along one of the handles 10 and is connected to a hand grip 46. The control of the motor by the rod 45 is of the usual construction employed in controlling motor cycle engines from the hand grips, or analogous ordinary constructions.

In reducing the invention to practice, certain minor features of construction, combination and arrangement of parts may necessitate alterations to which the patentee is entitled provided such alterations are comprehended within the scope of what is claimed.

What is claimed is:—

An apparatus of the character described including a frame, a pair of wheels rotatably carried by the frame, a bracket mounted on the frame and including a pair of superposed spaced inclined forwardly extending arms having their end portions provided with spaced sockets, a motor mounted in said sockets, straps engaging said motor and securing the same to said sockets, an arm formed integral with said socket and extending rearwardly from the same and cooperating with one of said first named arms for forming a second socket, a fuel tank mounted in said second named socket and arranged rearwardly of said motor and on the opposite side of said frame from said motor, and means for transmitting power from said motor to said wheels.

In testimony whereof I affix my signature in presence of two witnesses.

JOHN A. DECKER.

Witnesses:
GEORGE V. INGLISH,
MAX A. MUELLER.